United States Patent [19]

Di Giovanni

[11] 4,241,325

[45] Dec. 23, 1980

[54] DISPLACEMENT SENSING TRANSDUCER

[75] Inventor: Mario Di Giovanni, Pacific Palisades, Calif.

[73] Assignee: Micro Gage, Inc., El Monte, Calif.

[21] Appl. No.: 22,502

[22] Filed: Mar. 21, 1979

[51] Int. Cl.³ .............................................. G01L 1/22
[52] U.S. Cl. ........................................... 338/4; 338/42
[58] Field of Search ...................... 338/4, 5, 2, 42, 36; 73/726, 727, 720, 721

[56] References Cited

U.S. PATENT DOCUMENTS

| | | | |
|---|---|---|---|
| 3,213,400 | 10/1965 | Gieb | 338/4 |
| 3,303,451 | 2/1967 | Yuan | 338/42 X |
| 3,894,435 | 7/1975 | Shimada et al. | 73/721 |
| 4,157,032 | 6/1979 | Schaberg | 338/4 X |

FOREIGN PATENT DOCUMENTS 1905128 4/1970 Fed. Rep. of Germany ............ 73/727

Primary Examiner—C. L. Albritton
Attorney, Agent, or Firm—Christie, Parker & Hale

[57] ABSTRACT

A displacement transducer comprises a rigid support, a flexible diaphragm having a periphery attached to the support, and an interior free to deflect, and a strain sensor on the diaphragm. The diaphragm has a circular periphery and a plurality of concentric annular corrugations coaxial with the periphery. A first pair of strain gauges sense the tangential strain on one of the crests of the corrugations and a second pair of strain gauges sense the tangential strain in one of the troughs of the corrugations. The strain gauges are connected in an electrical bridge to provide a displacement representative output.

15 Claims, 6 Drawing Figures

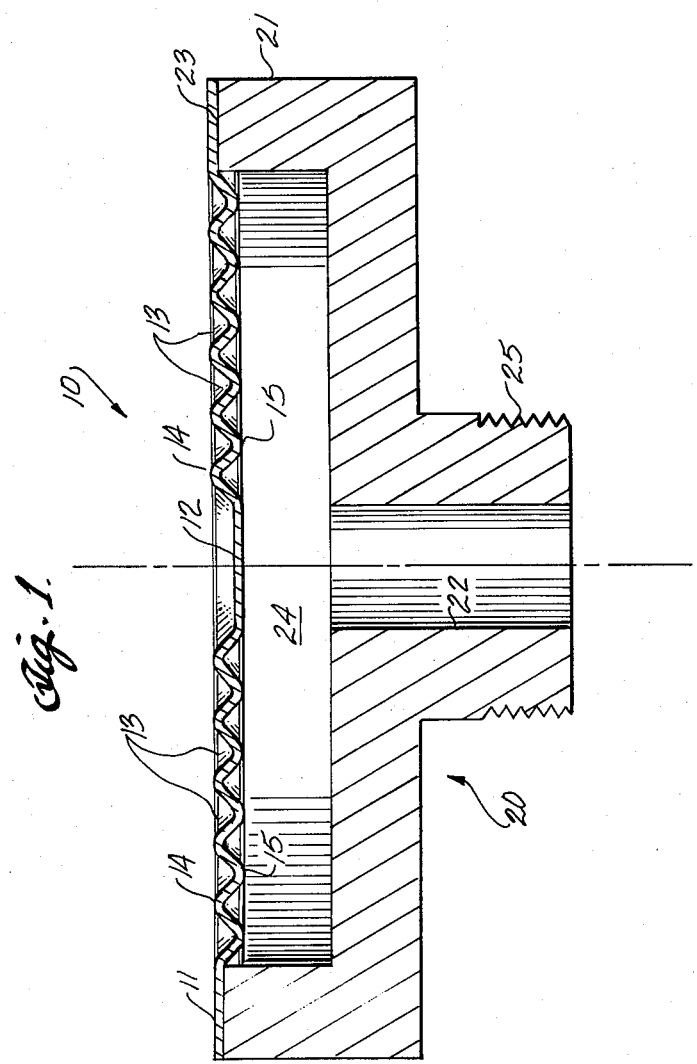

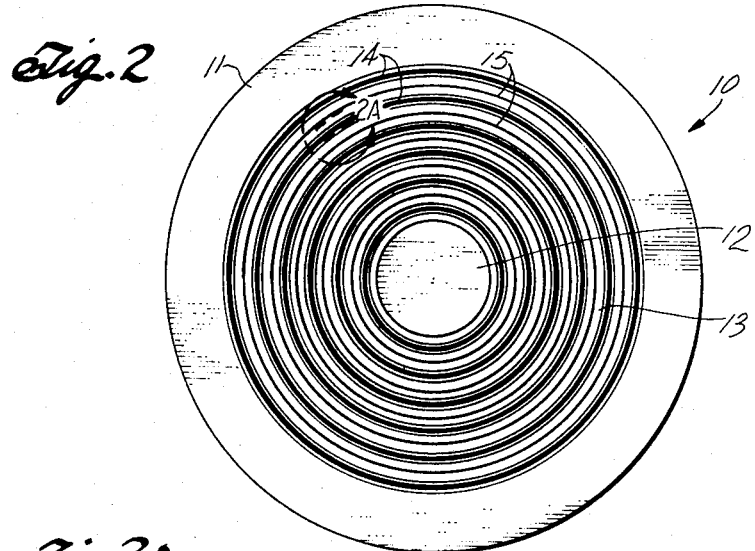
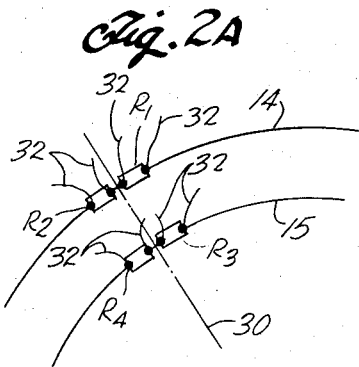
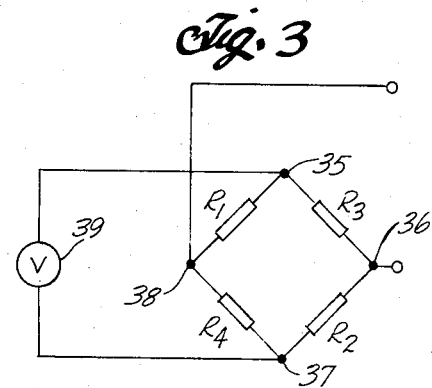
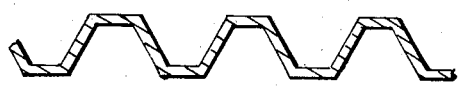

DISPLACEMENT SENSING TRANSDUCER

BACKGROUND OF THE INVENTION

This invention relates to displacement sensing transducers and, more particularly, to such a transducer especially well suited to measure low pressure differentials.

One type of displacement transducer in common use utilizes strain gauges mounted on a flat flexible diaphragm. The periphery of the diaphragm is attached to a rigid support, leaving the interior of the diaphragm free to deflect. The strain gauges are oriented on the surface of the diaphragm so as to sense radial strain as the diaphragm deflects and connected in an electrical bridge to generate an output signal related to the strain in the diaphragm and thus its displacement.

A principal application of the described transducer is to measure pressure differentials in a so-called ΔP cell. A typical cell design encapsulates the flat strain gauge bearing diaphragm in an oil medium between two isolation diaphragms having annular corrugations. The isolation diaphragms, which have a much lower spring constant than the flat strain gauge bearing diaphragm, serve to transmit forces resulting from the pressure differential to be measured to the latter diaphragm for transduction without affecting its response. The lower measurement limit of the described ΔP cell is a pressure differential in the order of 8 to 15 psi.

SUMMARY OF THE INVENTION

According to the invention, a displacement transducer comprising a rigid support, a flexible diaphragm having a periphery attached to the support and an interior free to deflect, and a strain sensor on the diaphragm is characterized in that the interior of the diaphragm has at least one annular corrugation, and the strain sensor is oriented to sense the tangential strain on the corrugation.

In the preferred embodiment, the diaphragm has a circular periphery and a plurality of concentric annular corrugations coaxial with the periphery. The corrugations alternately form concentric crests and troughs in the diaphragm. A first stain sensor senses the tangential strain on one of the crests, and a second strain sensor senses the tangential strain in one of the troughs, preferably in a region as close as possible to the first strain sensor.

This transducer is capable of measuring a much smaller pressure differential and responding more quickly than one with a flat transducer bearing diaphragm.

BRIEF DESCRIPTION OF THE DRAWINGS

The features of specific embodiments of the best mode contemplated of carrying out the invention are illustrated in the drawings, in which:

FIG. 1 is a side sectional view of a pressure transducer incorporating the principles of the invention;

FIG. 2 is a top plan view of the transducer of FIG. 1;

FIG. 2A is an enlarged schematic view of a portion of FIG. 2;

FIG. 3 is a schematic diagram of an electrical bridge which is part of the transducer of FIGS. 1 and 2;

FIG. 4 is a side sectional view of an alternative embodiment of the corrugations of the transducer of FIGS. 1 and 2; and FIG. 5 is a side sectional view of another alternative embodiment of the corrugations of the transducer of FIGS. 1 and 2.

DETAILED DESCRIPTION OF THE SPECIFIC EMBODIMENTS

In FIGS. 1 and 2, a flexible metallic diaphragm 10 of uniform thickness has a flat circular periphery 11, and an interior wherein a flat circular center 12 is surrounded by a plurality of corrugations 13. Corrugations 13 and periphery 11 are concentrically arranged about center 12. In the preferred embodiment depicted in FIG. 1, corrugations 13 have a sinusoidal shape, alternately forming peaks, namely crests 14 and troughs 15.

A rigid metallic support 20 has a hollow cylindrical portion 21 open at one end and closed at the other end except for a centrally located inlet pipe 22. Periphery 11 of diaphragm 10 is secured, for example by welding, to an annular face 23 at the open end of cylindrical portion 21. The hollow interior of cylindrical portion 21 and diaphragm 10 together define a chamber 24 into which a fluid is introduced through inlet pipe 22. External threads 25 on inlet pipe 22 are used for connection to a lead-in conduit.

Strain gauges $R_1$, $R_2$, $R_3$, and $R_4$, are attached to the surface of diaphragm 10. Preferably, they are attached to the surface of diaphragm 10, facing away from support 20, to provide easy access to the leads for connecting purposes and to keep the strain gauges out of contact with the pressurized fluid. Specifically, strain gauges $R_1$, and $R_2$ are arranged side by side at one of crests 14 and are oriented thereon so as to sense tangential strain at said crest 14, i.e., strain parallel to the circumference of corrugations 13. Similarly, strain gauges $R_3$ and $R_4$ are arranged side by side in one of troughs 15 and are oriented to sense the tangential strain in said trough 15, i.e., strain parallel to the circumference of corrugations 13. Strain gauges $R_1$ through $R_4$ should be small enough in length and width so their entire surface area fits on the selected crest and trough, and small enough in thickness to have no effect on the deflection of the diaphragm. By way of example, strain gauges $R_1$ through $R_4$ could be attached to the surface of diaphragm 10 by an epoxy bond. It has been discovered that the glue line of this bond should be as thin as possible. If the glue line is too thick, the transducer may exhibit creep or hysteresis. Preferably, strain gauges $R_1$ through $R_4$ are of the silicon piezoresistive type because of the large gauge factor of this type of strain gauge. Also, strain gauges $R_1$ through $R_4$ each have a straight elongated body with its length tangentially oriented with respect to the corrugations, as shown in FIG. 2A. Strain gauges $R_1$ through $R_4$ are matched as closely as possible, i.e., their resistances are as nearly identical as possible. To maintain the temperature of strain gauges $R_1$ through $R_4$ as nearly equal as possible, they are arranged as close to each other as physically possible. Thus, as illustrated by a radial line 30 in FIG. 2A, strain gauges $R_1$ and $R_2$ are in approximate radial alignment with strain gauges $R_3$ and $R_4$.

Strain gauges $R_1$ through $R_4$ each have lead wires 32 at the ends of its elongated body. As shown in FIG. 3, strain gauges $R_1$ through $R_4$ are connected in an electrical bridge having terminals 35, 36, 37, and 38. Specifically, leads 32 of strain gauge $R_1$ are connected to terminals 35 and 38, leads 32 of strain gauge $R_3$ are connected to terminals 35 and 36, leads 32 of strain gauge $R_2$ are connected to terminals 36 and 37, and leads 32 of strain gauge $R_4$ are connected to terminals 37 and 38. A source of direct or alternating voltage 39 is connected across terminals 35 and 37 to produce across terminals 36 and 38 an output voltage related in magnitude to the change in resistance of strain gauges $R_1$ through $R_4$.

In operation, a fluid, i.e., gas or liquid, whose gauge pressure is to be measured, is supplied to chamber 24 through inlet pipe 22. The outside of diaphragm 10 is exposed to atmospheric pressure. The differential pressure between the inside and outside of diaphragm 10 deflects the interior thereof upwardly, i.e., away from inlet 22, the extent of deflection and resulting displacement of center 12 depending upon the magnitude of the pressure differential. This deflection produces a tensile tangential strain on crests 14 and a compressive tensile tangential strain in troughs 15. The extent of the strain on crests 14 and troughs 15 depends upon the displacement of center 12, which in turn depends upon the differential pressure across diaphragm 10. The tensile strain on crests 14 increases the resistance of strain gauges $R_1$ and $R_2$, and the compressional strain in troughs 15 decreases the resistance of strain gauges $R_3$ and $R_4$. These changes in resistance are sensed by the electrical bridge of FIG. 3 and are reflected in its ouput voltage in a well known manner.

In general, it is desirable to place strain gauges $R_1$ through $R_4$ on the crests and troughs of the corrugations exhibiting the most tangential strain per unit displacement of center 12. The maximum stress occurs at a radial distance r from the center point of the diaphragm where $$r = a \left[ \frac{2}{q-1} \right]^{\frac{1}{q-3}}$$

and a is the radius of the diaphragm from center point to point of attachement to the rigid support and q is a factor representing the characteristics of the corrugations. The corrugation factor is expressed as $$q = \sqrt{1.5 \left[ \frac{H}{h} \right]^2 + 1}$$

where H is the height of the corrugations and h is the thickness of the diaphragm. In a typical example, a is 0.88 inch, q is 9, r is 0.69 inch, H is 0.0146 inch, and h is 0.002 inch. Preferably strain gauges $R_1$ through $R_4$ are mounted on crests and troughs closest to a distance of 0.69 inch from the center point of the diaphragm. The sensitivity of the diaphragm, i.e., displacement of center 12, is 0.0322 inch per psi, the tangential stress is 3097 psi, and the tangential strain is 108.68 microinches per inch.

The corrugations could have other cross-sectional shapes. In the embodiment of FIG. 4, the corrugations have a trapezoidal cross section, which may facilitate the proper placement of the strain gauges on the crests and in the troughs of the corrugations. In FIG. 5, the corrugations have a sawtoothed cross section, which may facilitate their manufacture.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, rather than atmospheric pressure,, the transducer could be referenced to absolute pressure, or some other pressure by exposing the outside surface of the diaphragm to the reference pressure. Further, the invention could be employed to measure displacement of a member rather than pressure by connecting such member to the center of the diaphragm, i.e., center 12 in the embodiment of FIG. 1. In its broadest aspects, the invention could be practiced with a single corrugation, although a plurality of corrugations is preferred in order to increase the sensitivity by measuring both tensile and compressional strain and to reduce the spring constant of the diaphragm, and thus reduce the pressure that can be sensed. Although it is preferable to sense tangential strain as shown, radial strain (preferably immediately adjacent to support 20) could be sensed. The transducer could be used to measure physical variables such as acceleration and force.

What is claimed is:

1. A displacement transducer comprising a rigid support, a flexible diaphragm having a uniform thickness, a periphery attached to the support, and an interior free to deflect, and means for sensing strain on the diaphragm to measure its deflection, characterized in that the interior of the diaphragm has at least one annular corrugation and the sensing means is oriented to sense the strain of the corrugation.

2. The transducer of claim 1, in which the sensing means is oriented to sense the tangential strain on the corrugation.

3. The transducer of claim 2, in which the sensing means is oriented to sense the strain on the peak of the corrugation.

4. The transducer of claim 2, in which the diaphragm has a plurality of concentric annular corrugations alternately forming crests and troughs in the diaphragm and the sensing means comprises first means for sensing the tangential strain on one of the crests and second means for sensing tangential strain on one of the troughs.

5. A pressure transducer comprising:
a flexible diaphragm having a circular periphery and a plurality of annular corrugations concentric with the periphery, the corrugations forming alternating concentric crests and troughs;
a rigid housing;
means for securing the entire periphery of the diaphragm to the housing, leaving the interior of the diaphragm free to deflect;
a chamber for fluid, the pressure of which is to be measured, formed by the interior of the housing and the diaphragm;
first means for sensing the tangential surface strain in a first region on a crest of a corrugation;
second means for sensing the tangential surface strain in a second region in a trough of a corrugation; and
means for generating an electrical signal representative of the strain sensed by the first and second sensing means.

6. The pressure transducer of claim 5, in which the first and second sensing means each comprise a resistive strain gauge.

7. The pressure transducer of claim 5, in which the first sensing means comprises first and second resistive strain gauges mounted on one crest side by side, and the second sensing means comprises third and fourth strain gauges mounted on an adjacent trough side by side, and the generating means comprises a bridge having first, second, third, and fourth terminals, means for connecting the first strain gauge between the first and third terminals, the fourth strain gauge between the second and third terminals, the third strain gauge between the first and fourth terminals, and the second strain gauge between the second and fourth terminals, and means for connecting a voltage source across the first and second terminals to produce across the third and fourth terminals a voltage related to the resistive imbalance of the strain gauges.

8. The transducer of claim 7, in which the strain gauges are of the piezoresistive type.

9. The transducer of claim 8, in which the first and second regions are in close proximity to each other.

10. The pressure transducer of claim 5, in which the first and second regions are in approximate radial alignment.

11. The transducer of claim 4, in which the first sensing means comprises first and second resistive strain gauges mounted on one crest side by side, and the second sensing means comprises third and fourth strain gauges mounted on an adjacent trough side by side in approximate radial alignment with the first and second strain gauges, the transducer additionally comprising a bridge having first, second, third, and fourth terminals,, means for connecting the first strain gauge between the first and third terminals, the fourth strain gauge between the second and third terminals, the third strain gauge between the first and fourth terminals, and the second strain gauge between the second and fourth terminals, and means for connecting a voltage source across the first and second terminals to produce across the third and fourth terminals a voltage related to the resistive imbalance of the strain gauges.

12. The pressure transducer of claim 11, in which the strain gauges are of the silicon piezoresistive type.

13. The transducer of claim 1, in which the sensing means is oriented to sense the strain on the peak of the corrugation.

14. The transducer of claim 1, in which the sensing means is a strain gauge of the silicon piezoresistive type having a straight elongated body with connecting leads at its ends and means for sensing the change in resistance between the connecting leads.

15. The transducer of claim 14, in which the strain gauge is mounted on the corrugation so the length of its body is tangentially oriented with respect to the corrugation.

* * * * *